(12) United States Patent
Fukuda et al.

(10) Patent No.: US 7,786,629 B2
(45) Date of Patent: Aug. 31, 2010

(54) ELECTRIC MOTOR MOUNTING STRUCTURE

(75) Inventors: Takayuki Fukuda, Midori (JP); Masakazu Kamei, Shibukawa (JP)

(73) Assignee: Mitsuba Corporation, Kiryu-shi (JP)

( * ) Notice: Subject to any disclaimer, the term of this patent is extended or adjusted under 35 U.S.C. 154(b) by 372 days.

(21) Appl. No.: 11/885,881

(22) PCT Filed: Mar. 2, 2006

(86) PCT No.: PCT/JP2006/303964

§ 371 (c)(1), (2), (4) Date: Sep. 7, 2007

(87) PCT Pub. No.: WO2006/095630

PCT Pub. Date: Sep. 14, 2006

(65) Prior Publication Data

US 2008/0191571 A1  Aug. 14, 2008

(30) Foreign Application Priority Data

Mar. 9, 2005  (JP) .............................. 2005-066370

(51) Int. Cl.
   *H02K 5/24* (2006.01)
(52) U.S. Cl. .......................................... 310/51; 310/91
(58) Field of Classification Search .................... 310/51, 310/89, 91, 71; 248/631
   See application file for complete search history.

(56) References Cited

U.S. PATENT DOCUMENTS

| 4,161,304 A * | 7/1979 | Brenner et al. ......... 267/140.13 |
|---|---|---|
| 4,253,634 A * | 3/1981 | Daniels ................... 248/604 |
| 4,425,813 A * | 1/1984 | Wadensten ............... 74/87 |
| 4,442,367 A * | 4/1984 | Suzuki ................... 310/91 |
| 4,742,256 A * | 5/1988 | Tanaka et al. ........... 310/51 |
| 4,805,868 A * | 2/1989 | Claude ................... 248/603 |
| 6,237,185 B1 | 5/2001 | Goto et al. |
| 6,340,263 B1 | 1/2002 | Fleischer |
| 6,354,578 B1 | 3/2002 | Nakatsukasa et al. |
| 6,498,917 B2 * | 12/2002 | Takami ................... 399/227 |
| 6,717,298 B2 * | 4/2004 | Kitamura et al. ......... 310/51 |
| 2003/0038548 A1* | 2/2003 | Nadeau ................... 310/51 |
| 2007/0226939 A1* | 10/2007 | Takada .................. 15/250.31 |

FOREIGN PATENT DOCUMENTS

| JP | A-63-038731 | 2/1988 |
|---|---|---|
| JP | A-2000-182725 | 6/2000 |
| JP | A-2001-090779 | 4/2001 |
| JP | A-2002-521258 | 7/2002 |
| JP | B2-3430884 | 7/2003 |

* cited by examiner

*Primary Examiner*—Thanh Lam
(74) *Attorney, Agent, or Firm*—Oliff & Berridge, PLC

(57) ABSTRACT

When a bracket to which an electric motor for wipers has been attached is attached to a vehicle body via a rubber mount therebetween for antivibration, vibrations generated when the electric motor is actuated are prevented from being transmitted to the body while allowing a part not tightened with a nut to act as a free end. A part of the rubber mount being in contact with the body is formed as a truncated cone part tapered toward a front edge so that the front edge of the rubber mount being in contact with the vehicle body does not have a part not tightened with the nut. As a result, there is no part that is not tightened with the nut and that acts as a free end, and the function to prevent vibrations from being transmitted is further improved.

9 Claims, 8 Drawing Sheets ed with a nut 35.

ELECTRIC MOTOR MOUNTING STRUCTURE

This application is the U.S. National Stage of PCT/JP2006/303964, filed Mar. 2, 2006, which claims priority from JP2005-066370, filed Mar. 9, 2005, the entire disclosures of which are incorporated herein by reference hereto.

BACKGROUND

The present invention relates to an electric motor mounting structure.

Generally, a plate-like bracket is used to hold a case frame on which an electric motor, such as a windshield wiper motor, has been mounted. The plate-like bracket is attached to a vehicle body side and a mount rubber (i.e., grommet) is placed between the bracket and the body side. The mount rubber makes it difficult to transmit vibrations caused when the wiper motor is actuated to the vehicle body, thus reducing the generation of a specific frequency that causes noises.

In other words, to attach a windshield wiper motor to a vehicle body, a bracket, molded by for example pressing a metal plate, is placed between the wiper motor and the vehicle body, and hence vibrations caused by actuating the wiper motor are transmitted to the vehicle body via the bracket. Therefore, the mount rubber molded by an elastic material, such as rubber, is placed between the bracket and the vehicle body, thus preventing these vibrations caused by the actuation of the wiper motor from being transmitted from the bracket to the vehicle body (see Japanese Published Unexamined Patent Application No. 2000-182725 for example).

SUMMARY

However, in this example, a conventional mount rubber 30 is, as a whole, shaped like a cylinder elongated in the direction of its cylinder axis as shown in FIG. 8. A bracket 31 is fitted in a groove 30a formed in the outer peripheral surface of the cylinder over the entire periphery, and a cylindrical collar 32 is fitted on the inner peripheral surface thereof. Further, an end face 31b of the mount rubber 31 is brought into contact with a panel 29 provided on the side of the vehicle body (generally, an inner panel provided on the back surface of the vehicle body), and a bolt 34 inserted into the collar 32 from the other end face 31c thereof with a washer 33 that is tightened with a nut 35.

In this structure, the mount rubber 30 is must be larger than the outer diameter of the nut 35 in order to improve vibration absorbability. However, although a part, which is tightened with the nut 35, of the body-side contact surface of the mount rubber 31 is in a rigid state and can reflect vibrations transmitted from the bracket 31 to the mount rubber 30, the other part of the body-side contact surface greatly exceeding the diameter of the nut 35 is not tightened with the nut 35, and is in a loosened state. Therefore, disadvantageously, vibrations transmitted to the bracket 31 are transmitted to the vehicle body, thus causing noises. The present invention solves the above problems and can achieve various other advantages.

According to a first exemplary aspect of the present invention, an electric motor mounting structure includes a bracket that holds a case frame that is attached to an electric motor, with the bracket attached to a vehicle body via a mount rubber therebetween. The mount rubber includes a cylindrical main part that receives the bracket and a truncated cone part that is disposed at an end of a cylinder axis of the main part and that is tapered toward the vehicle body, with the main part and the truncated cone part being integrally formed.

According to a second exemplary aspect of the present invention, an electric motor mounting includes an electric motor, a case frame attached to the electric motor, a bracket that holds the case frame, a mount rubber disposed between the bracket and a vehicle body, and a holding member that holds the bracket and the mount rubber to the vehicle body. The mount rubber includes a cylindrical main part that receives the bracket and a truncated cone part that is disposed at an end of a cylinder axis of the main part and that is tapered toward the vehicle body, with the main part and the truncated cone part being integrally formed. The holding member includes a first tightening member and a second tightening member fixed to the vehicle body.

According to exemplary aspects of the present invention, since the vehicle-body-side front edge toward which the mount rubber is tapered comes into contact with the vehicle body, a part of the mount rubber tightened with the nut is brought into contact with the vehicle body, whereas a free part not tightened with the nut never comes into contact with the vehicle body. Therefore, vibrations transmitted from the side of the electric motor can be prevented from being transmitted to the vehicle body via the mount rubber.

According to exemplary aspects of the present invention, a further improved antivibration capability is achieved.

BRIEF DESCRIPTION OF THE DRAWINGS

Various exemplary embodiments will be described with reference to the drawings, wherein.

DETAILED DESCRIPTION OF EMBODIMENTS

Figure 1:
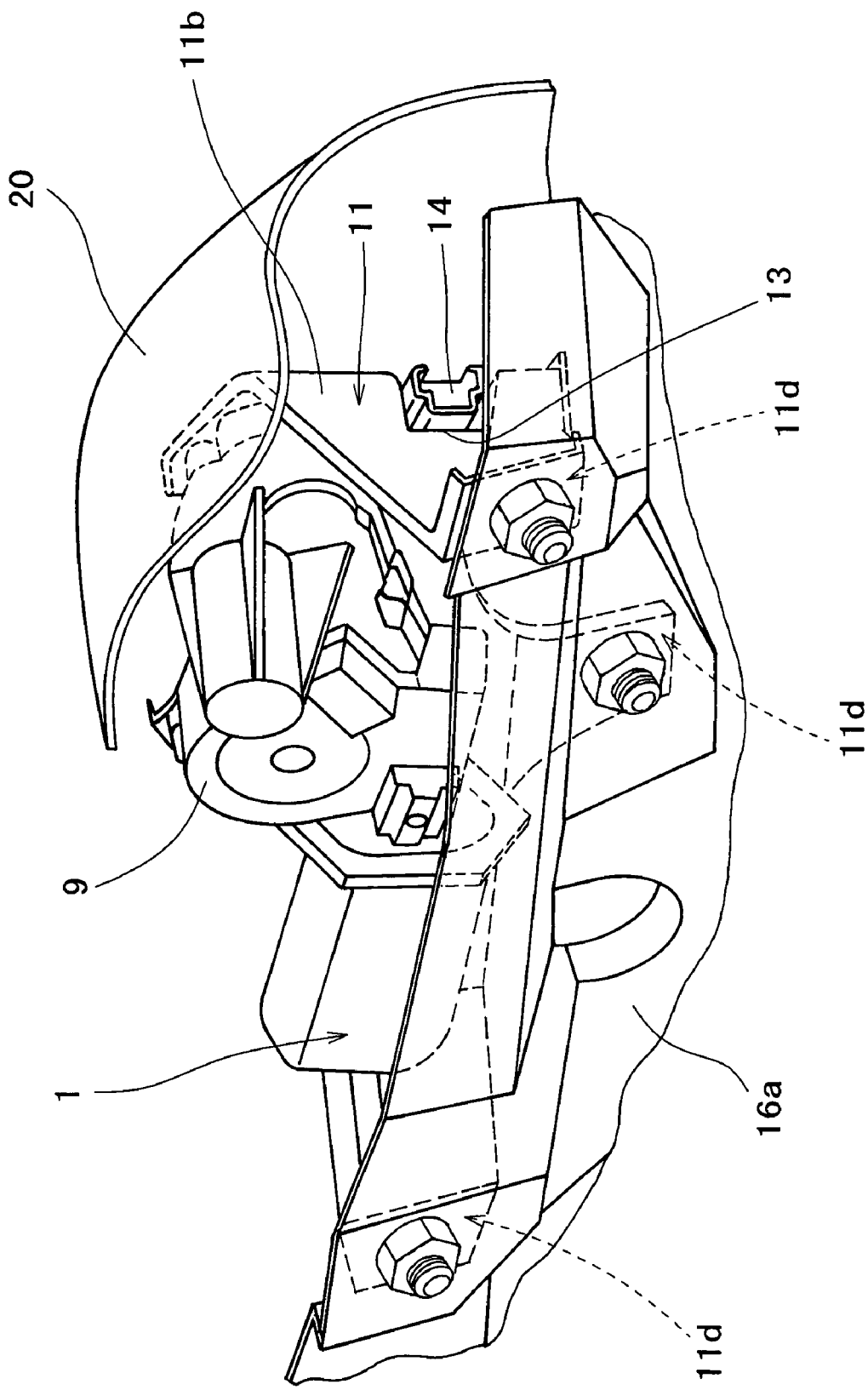
FIG. 1 is a perspective view showing a bracket attached to the vehicle body side.
Figure 2:
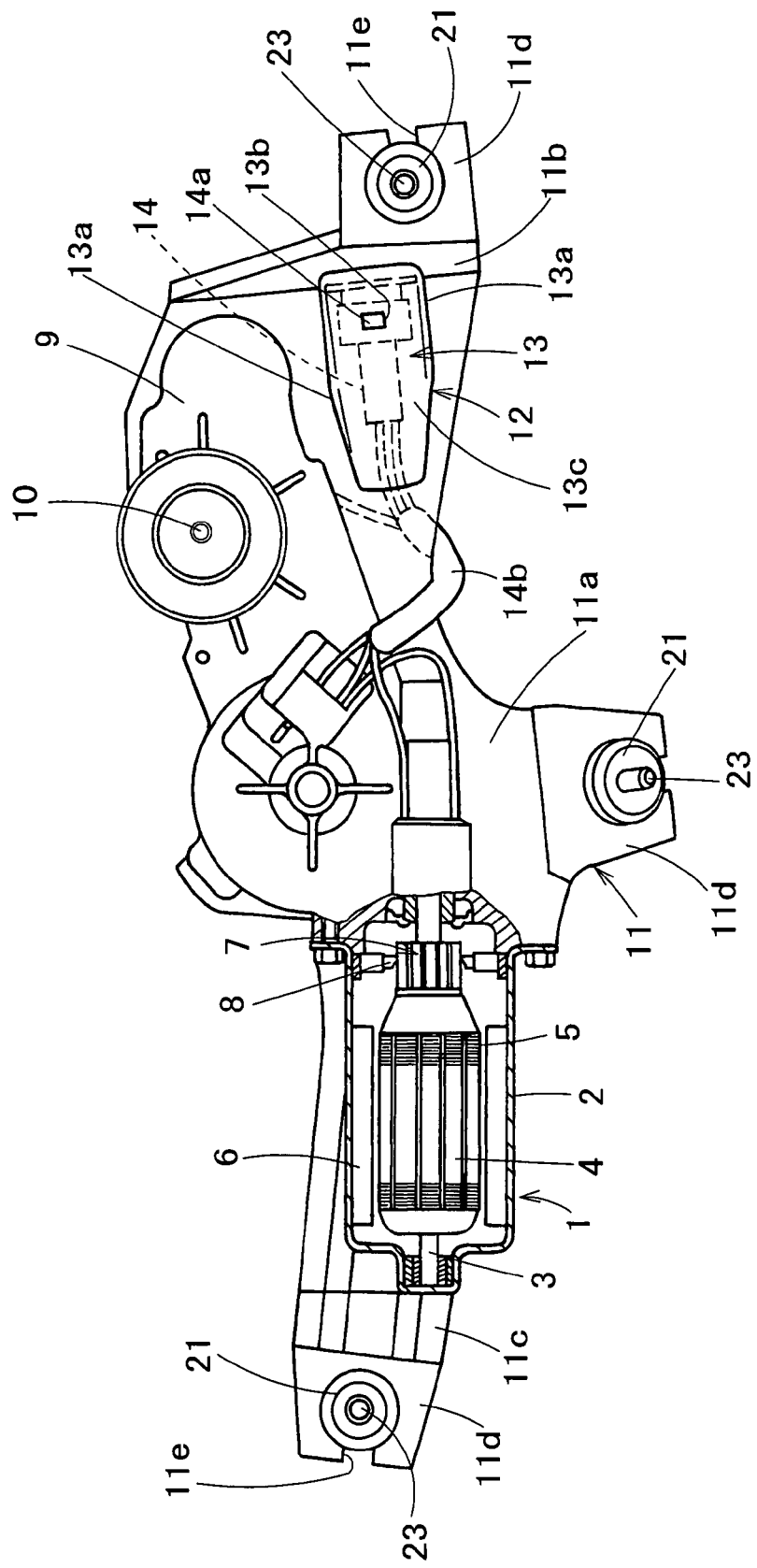
FIG. 2 is a front view showing the bracket attached to an electric motor.
Figure 3:
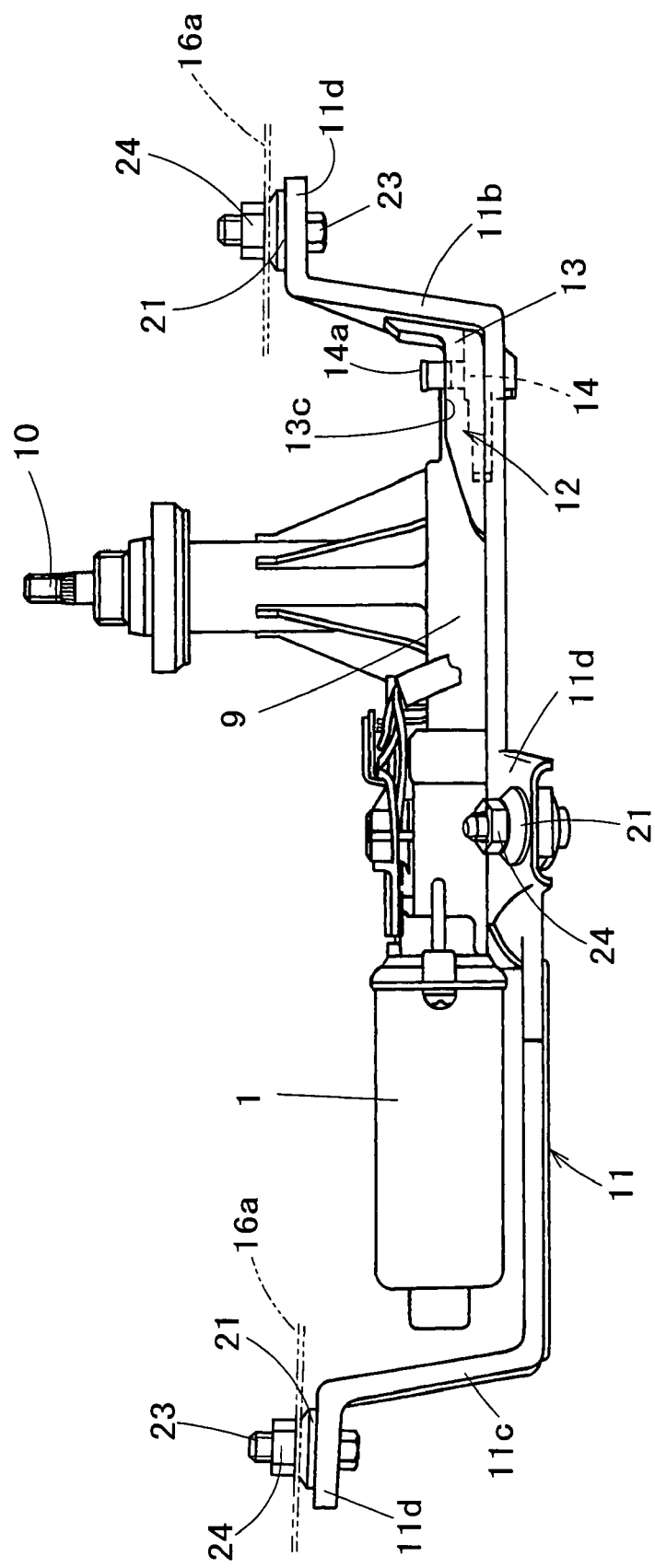
FIG. 3 is a side view showing the bracket attached to the electric motor.
Figure 4:
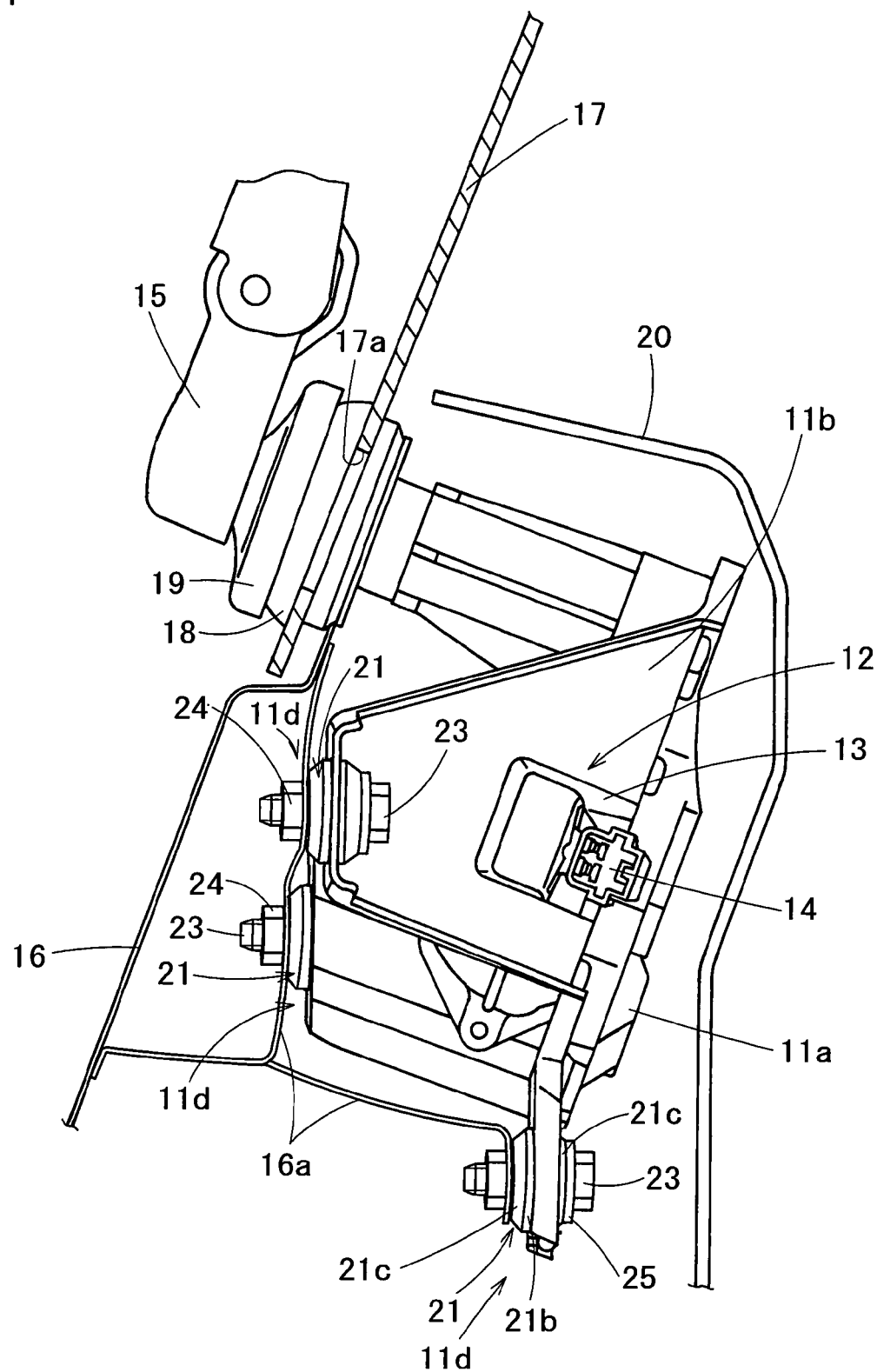
FIG. 4 is a side view showing the bracket attached to the vehicle body side.
Figure 5A:
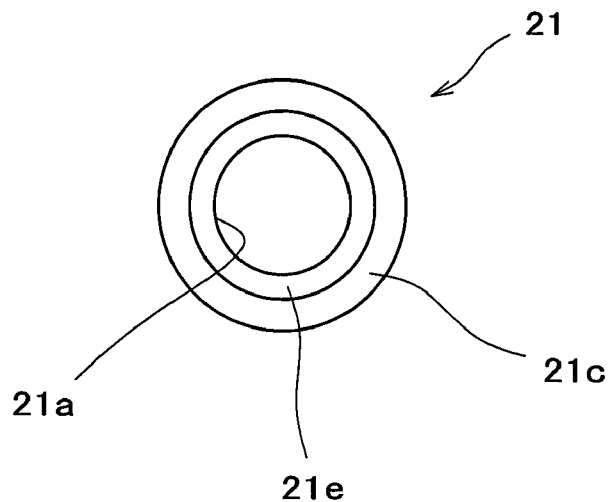
FIG. 5A is a front view of a grommet.
Figure 5B:
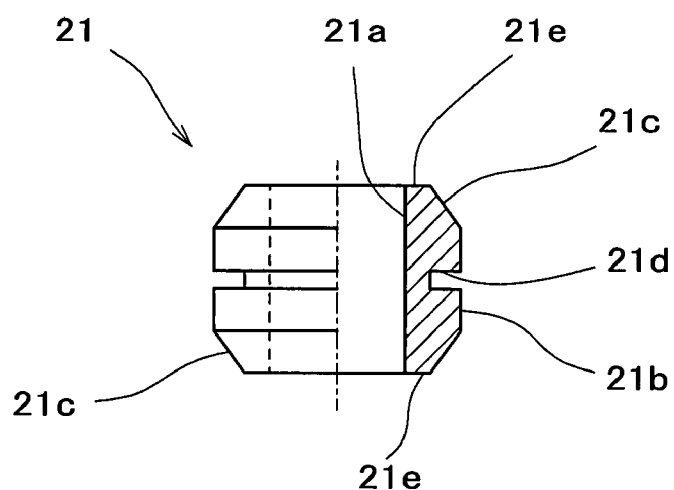
FIG. 5B is a partially cross-sectional side view of the grommet.
Figure 5C:
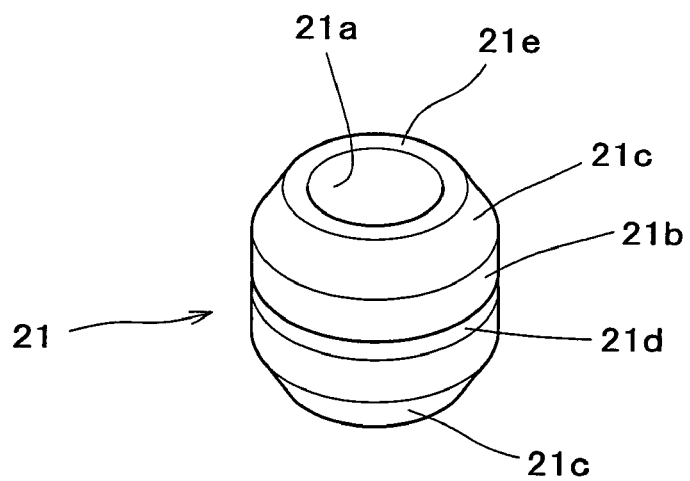
FIG. 5C is a perspective view of the bracket.
Figure 6:
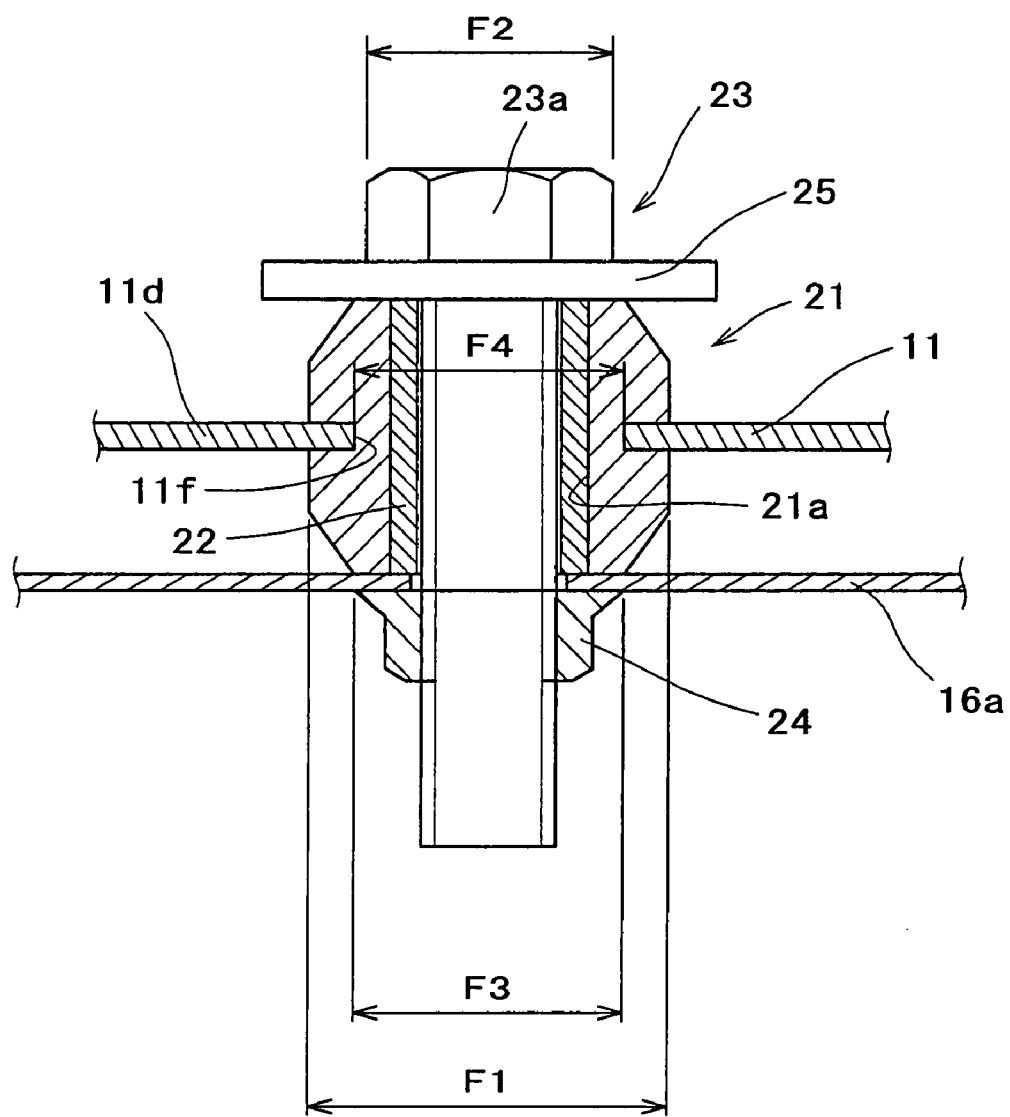
FIG. 6 is a chief-part cross-sectional view showing a state in which the grommet is mounted.
Figure 7:
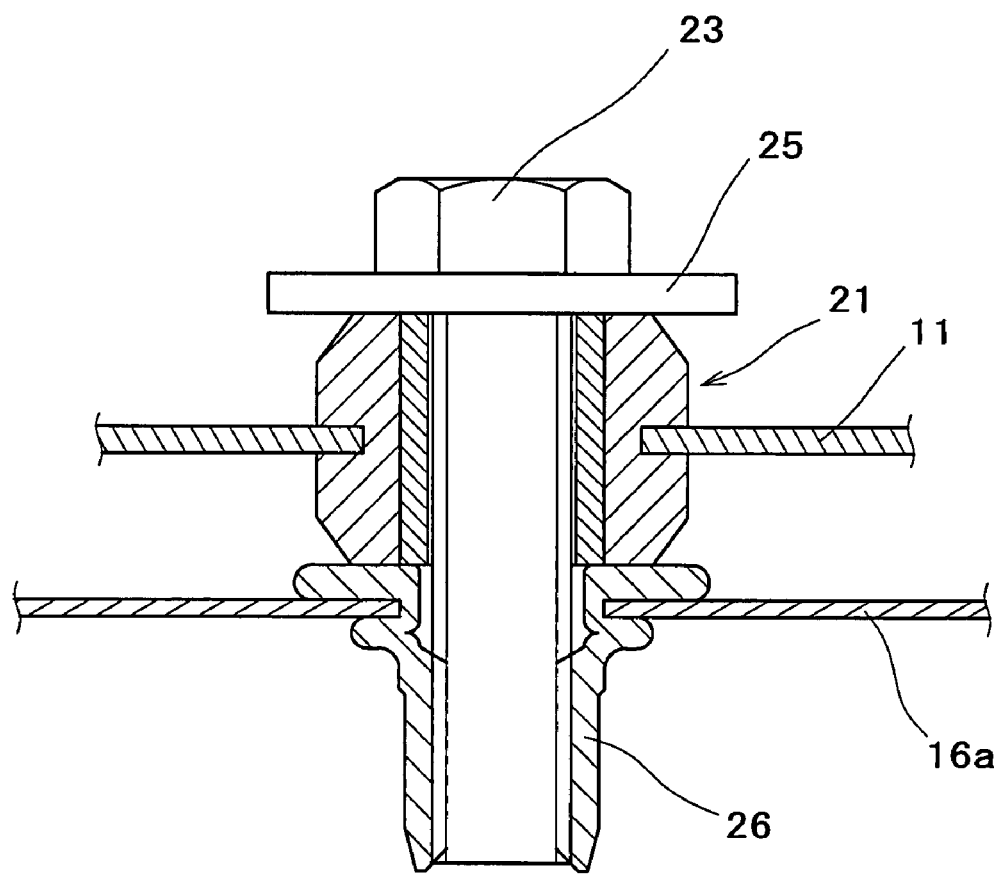
FIG. 7 is a chief-part cross-sectional view showing a second state in which the grommet is mounted.
Figure 8:
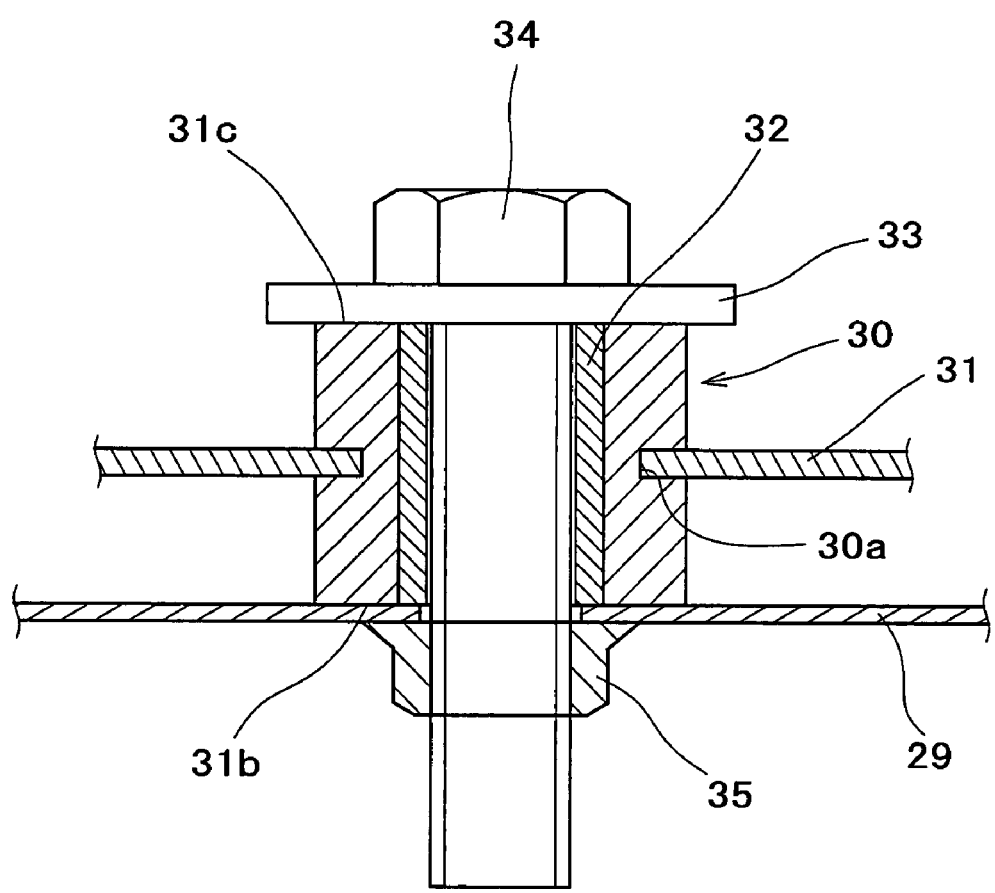
FIG. 8 is a cross-sectional view showing an exemplary structure.

Next, embodiments of the present invention will be described with reference to the accompanying drawings. In FIGS. 1-7, reference numeral 1 designates an electric motor for vehicles. The electric motor 1 includes a motor shaft 3 rotatably supported by a yoke 2 shaped like a closed-end cylinder, an armature core 4 fixed to the motor shaft 3, a coil 5 wound on the armature core 4, a pair of permanent magnets 6 fixed to the inner circumferential surface of the yoke 2 so as to face each other, a commutator 7 fixed to the motor shaft 3, and a brush 8 slidably contacting the commutator 7. The structure formed by these elements is a conventional one.

On the other hand, reference numeral 9 designates a case frame integrally attached to the opening-side edge part of the yoke 2. The forward end of the motor shaft 3 projects out of the yoke 2 and is contained in the case frame 9. A series of decelerating members are provided at the forward end of the motor shaft 3. Output is applied to an output shaft 10 in a decelerated state. This structure is also a conventional one.

The output shaft 10 passes through a through-hole 17a formed in a window glass 17 adjoining an outer panel 16 of the vehicle body, and is watertightly supported with a mount rubber 18 and a cap 19. A wiper arm 15 is attached to the forward end of the output shaft 10 projecting out of the vehicle body by use of an attaching member, not shown, such as a nut.

The electric motor 1 and the case frame 9 are attached to the plate-like bracket 11 of the present invention. In more detail, at both ends of a first plate part 11a to which the electric motor 1 and the case frame 9 are attached, the bracket 11 has respectively second and third plate parts 11b and 11c adjoiningly bent toward the surface to which the electric motor 1 is attached in the shape of the capital letter L when viewed from the side. A coupler attaching portion 12 is formed between the first plate part 11a and the second plate part 11b on the side of the case frame 9. In more detail, the coupler attaching portion 12 has a coupler containing chamber 13 formed concavely at the first plate part 11a so as to expand toward and reach the second plate part 11b. Accordingly, the coupler containing chamber 13 has an opening formed at the side of the first plate part 11a opposite the side toward which the second plate part 11b is bent and an opening formed at the side of the second plate part 11b opposite the side toward which the first plate part 11a is bent. A side wall 13a that is a construction element of the coupler containing chamber 13 functions as a bead (i.e., a reinforcing rib) that reinforces the bent pieces of the first and second plate parts 11a and 11b.

A bottom wall 13c of the coupler containing chamber 13 has an attaching hole 13b used to attach a coupler 14 by allowing an engagement projection 14a of the coupler 14 to forcibly pass therethrough. Accordingly, the coupler 14 is fitted and attached to the coupler containing chamber 13. The coupler 14 attached thereto is brought into contact with both walls 13a of the coupler containing chamber 13, thus stopping the coupler 14 from being rotated. Reference character 14b designates a lead wire connected to the coupler 14.

Each of the three plate parts 11a, 11b, and 11c of the bracket 11 has an attaching portion 11d having an attaching hole 11f partially having a cut 11e. The attaching portions 11d project out of the bracket 11. A mount rubber 21 having a through-hole 21a is fitted into the attaching hole 11f of each of the three attaching portions 11d. A cylindrical collar 22 is fitted into the through-hole 21a of each of the mount rubbers 21. A bolt 23 is inserted into the collar 22 from the side opposite the side on which the electric motor 1 is mounted. The bolt 23 is inserted into an inner panel 16a disposed on the back surface of the outer panel 16 of the vehicle, and is connected thereto with a nut 24. An interior plate 20 forming the interior surface of the vehicle is provided in such a way as to cover the motor 1 inside the vehicle at the attaching portion 11d, and is fixed to the inner panel 16a at a plurality of points thereof. Reference numeral 25 designates a washer placed between a bolt head 23a and the mount rubber 21.

The mount rubber (grommet) 21 has a cylindrical main part 21b and a truncated cone part 21c that are integrally made of a rubber elastic material. The cylindrical main part 21b has a diameter F1 greater (F1>F2) than the diameter F2 of the nut 24 (which is approximately equal to the diameter of the bolt head). The truncated cone part 21c, located at both ends of the rubber mount 21, is tapered in the direction of the cylindrical axis, and has a front edge 21e whose diameter F3 is approximately equal to the diameter of the nut 24 (F3≅F2). As described above, the inner circumferential surface of the mount rubber 21 serves as the through-hole 21a into which the collar 22 is inserted. An attaching groove 21d that is fitted to the attaching hole 11f formed in the bracket attaching portion 11d is formed in the outer circumferential surface of the main part 21b peripherally over the entire circumference. The mount rubber 21 is tightened with the nut 24 in a state in which the tapered front edge 21e of the truncated cone part 21c is in contact with the inner panel 16a. In this embodiment, the outer diameter F4 of the groove bottom of the attaching groove 21d is approximately equal to the diameter F3 of the front edge 21e of the truncated cone part (F3≅F4).

Well-known vulcanized rubber is employed as the mount rubber 21. Specific limitations are not imposed on the rubber material. Examples include natural rubber (NR), isoprene rubber (IR), butadiene rubber (BR), styrene-butadiene copolymer rubber (SBR), acrylonitrile-butadiene copolymer rubber (NBR), chloroprene rubber (CR), fluororubber (FKM), butyl rubber (IIR), ethylene-propylene copolymer rubber (EPM), ethylene-propylene-diene terpolymer rubber (EPDM), hydrogenated nitrile rubber (H-NBR), silicone rubber, epichlorohydrin rubber (CO, ECO), polysulfide rubber (T), and polyurethane rubber (U). These can be used in single form or in mixed form. The mount rubber 21 is mentioned as an example, and is produced by vulcanizing a mixture of any of these rubbers and a well-known additive, such as a vulcanizing agent, a vulcanization accelerating agent, a softening agent, an antiaging agent, a filler, a silane coupling agent, silica, or carbon black, according to a conventionally known method, such as press vulcanization. In particular, when noise reduction is treated as important, butyl rubber is suitable, and, when emphasis is placed upon the coexistence of the noise reduction of a wiper operation sound with the system rigidity (size) of a wiper, chloroprene rubber is suitable.

The use temperature of the mount rubber 21 is 35° C. to 70° C., preferably 40° C. to 60° C., in consideration of molding conditions. In this case, the hardness of the rubber material from which the mount rubber 21 is molded is 35 to 65 degrees, and compressibility is 0 to 20%, preferably 1 to 5%.

In the embodiment of the present invention structured as above, the bracket 11 on which the electric motor 1 is mounted is attached to the inner panel 16a that is a construction element of the vehicle body with the mount rubber 21 placed therebetween so as not to cause vibrations. The mount rubber 21 has the main part 21b whose diameter is greater than that of the nut 24, and is superior in vibration absorbability. The front edge 21e of the truncated cone part 21c, whose diameter becomes smaller in proportion to an approach to the front edge 21e being in contact with the vehicle body, is brought into contact with the body side. As a result, there exists no part that is in contact with the body side of the mount rubber 21 and that is in a free state without being tightened with the nut 24. Therefore, vibrations generated by the actuation of the electric motor 1 are lessened before being transmitted to the vehicle body, thus preventing the occurrence of noise.

Additionally, in this structure, the diameter of the front edge 21e of the truncated cone part is approximately equal to the diameter of the nut 24, and hence a further improved antivibration function can be achieved. Additionally, the diameter F4 of the attaching groove 21d of the mount rubber 21 and the end of the truncated cone part 21c are approximately the same, and hence there is no topsy-turvy of top and bottom, and construction elements can be assembled from either side, thus heightening assembly productivity.

Still additionally, in this structure, the diameter F4 of the attaching groove 21d of the mount rubber 21 is approximately equal to the diameter F3 of the front edge 21e being in contact with the body side. As a result, since the vibration of the bracket 11 is transmitted to a rubber part that lies outside a part tightened with the bolt 23 and the nut 24 and that has both ends formed in the shape of the truncated cone part 21c not being in contact with the washer 25 and the body side 16a, construction elements are not assembled in a state in which the bracket 11 comes into the tightened part. Therefore, vibrations are reduced at the rigid part, and a more excellent anti-vibration performance is achieved.

The present invention is not limited to the above embodiment, of course. For example, the nut-bolt relationship serving as a holding member may be formed as an opposite tightening structure, and an inclined surface forming the truncated cone part may be curved, or appropriately shaped according to need, instead of being linear. Furthermore, as in the second embodiment shown in FIG. 7, a "pop nut" 26 may be tightened in a state in which the mount rubber 21 is not in direct contact with the body side 16a.

As described above, the electric motor mounting structure according to the present invention is useful as an electric motor mounting structure used to attach a plate-like bracket for holding a case frame on which an electric motor, such as a windshield wiper motor, has been mounted to a vehicle body. In particular, the electric motor mounting system is suitable to prevent the occurrence of noises caused when vibrations transmitted to the bracket are transmitted to the body side.

The invention claimed is:

1. An electric motor mounting structure, comprising:
  a bracket that holds a case frame that is attached to an electric motor, with the bracket attached to a vehicle body via a mount rubber therebetween, wherein:
  the mount rubber comprises:
    a cylindrical main part; and
    a truncated cone part that is disposed at an end of a cylinder axis of the main part and tapered toward the vehicle body;
    the main part and the truncated cone part are integrally formed by either one of butyl rubber or chloroprene rubber materials with 35-65 degrees of hardness and 1-20 percent of compressibility.

2. An electric motor mounting structure, comprising:
  an electric motor,
  a case frame attached to the electric motor,
  a bracket that holds the case frame,
  a mount rubber disposed between the bracket and a vehicle body, and
  a holding member that holds the bracket and the mount rubber to the vehicle body, wherein:
  the mount rubber comprises:
    a cylindrical main part;
    a truncated cone part that is disposed at an end of a cylinder axis of the main part and tapered toward the vehicle body, the main part and the truncated cone part being integrally formed by either one of butyl rubber or chloroprene rubber materials with 35-65 degrees of hardness and 1-20 percent of compressibility: and
    a through-hole into which a collar is fit,
  the holding member comprises:
    a first tightening member that is inserted into the mount rubber and the collar; and
    a second tightening member that tightens the first tightening member so as to abut with the vehicle body,
  an outer diameter of the main part of the mount rubber is greater than a diameter of the first tightening member, and
  a diameter of a tapered front edge of the truncated cone part that abuts with the vehicle body is substantially equal to a diameter of the second tightening member.

3. The electric motor mounting structure according to claim 1, further comprising:
  a holding member that holds the bracket and the mount rubber to the vehicle body, wherein a diameter of the mount rubber being in contact with the vehicle body is substantially equal to a diameter of the holding member lying on a side of the vehicle body.

4. The electric motor mounting structure according to claim 1, wherein the truncated cone part is located at both ends of the main part.

5. The electric motor mounting structure according to claim 2, wherein the truncated cone part is located at both ends of the main part.

6. The electric motor mounting structure according to claim 1, further comprising:
  a holding member that holds the bracket and the mount rubber to the vehicle body, wherein the main part has a diameter greater than a diameter of the holding member lying on a side of the vehicle body.

7. The electric motor mounting structure according to claim 2, wherein the outer diameter of the main part is greater than the diameter of the second tightening member.

8. The electric motor mounting structure according to claim 1, further comprising:
  a holding member that holds the bracket and the mount rubber to the vehicle body, wherein:
    the main part includes a groove that receives the bracket, and
    an outer diameter of the groove is substantially equal to a diameter of the holding member lying on a side of the vehicle body.

9. The electric motor mounting structure according to claim 2, wherein:
  the main part includes a groove that receives the bracket, and
  an outer diameter of the groove is substantially equal to the diameter of the second tightening member.

* * * * *